(12) United States Patent  (10) Patent No.: US 8,790,511 B2
Yang  (45) Date of Patent: Jul. 29, 2014

(54) WATER FILTERING DEVICE

(76) Inventor: Wender Yang, New Taipei (TW)

(*) Notice: Subject to any disclaimer, the term of this patent is extended or adjusted under 35 U.S.C. 154(b) by 376 days.

(21) Appl. No.: 13/308,685

(22) Filed: Dec. 1, 2011

(65) Prior Publication Data

US 2012/0261322 A1  Oct. 18, 2012

(30) Foreign Application Priority Data

Apr. 12, 2011  (TW) .............. 100116993 A (51) Int. Cl.
*B01D 35/30* (2006.01)
*C02F 1/00* (2006.01)

(52) U.S. Cl.
CPC ........... *C02F 1/002* (2013.01); *C02F 2201/003* (2013.01); *C02F 2201/004* (2013.01)
USPC ............. 210/85; 210/244; 210/245; 210/359; 210/419; 210/416.3

(58) Field of Classification Search
CPC .... B01D 33/01; B01D 33/0183; B01D 35/26; B01D 35/34; C02F 1/002; C02F 2209/445; C02F 2307/02; C02F 2307/04; C02F 1/003; C02F 1/004
USPC ........ 210/85, 244, 359, 416.3, 245, 418, 419, 210/429, 431; 116/298, 309, 332, DIG. 6
See application file for complete search history.

(56) References Cited

U.S. PATENT DOCUMENTS

| 4,035,150 A | * | 7/1977 | Jaffe ............................... 436/66 |
| 4,986,901 A | * | 1/1991 | Nohren et al. .................. 210/85 |
| 5,549,816 A | * | 8/1996 | Harp et al. ..................... 210/120 |
| 2007/0187282 A1 | * | 8/2007 | Seijas ........................... 206/534 |

FOREIGN PATENT DOCUMENTS

| JP | 1988-086894 | 6/1988 |
| JP | 1988-164994 | 10/1988 |
| JP | 1990-091691 | 7/1990 |
| JP | 1991-089623 | 9/1991 |
| JP | 2009-509744 A | 3/2009 |

* cited by examiner

*Primary Examiner* — Matthew O Savage
(74) *Attorney, Agent, or Firm* — Wang Law Firm, Inc.; Li K. Wang; Stephen Hsu (57) ABSTRACT

A water filtering device includes a filter element and telescopically interconnected inner and outer cylinder units. Each of the inner and outer cylinder units has an open inner end and a closed outer end. A first space is formed in the inner cylinder unit. The filter element is disposed within the inner cylinder unit, and is adjacent to the inner end of the inner cylinder unit so as to define a second space between the filter element and the outer cylinder unit. The outer cylinder unit is movable on the inner cylinder unit, such that the outer ends of the inner and outer cylinder units are moved toward each other, thereby forcing water to flow from the second space into the first space through the filter element.

15 Claims, 9 Drawing Sheets

WATER FILTERING DEVICE

CROSS-REFERENCE TO RELATED APPLICATION

This application claims priority of Taiwanese Application No. 100116993, filed on Apr. 12, 2011.

BACKGROUND OF THE INVENTION

1. Field of the Invention

This invention relates to a container, and more particularly to a water filtering container.

2. Description of the Related Art

A conventional portable container having water-filtering function can be classified into two types. The first type includes a compressible bottle and a filter element disposed removably within an opening of the bottle, e.g., a polyethyelene terephthalate (PETE) bottle, such that bottle can be compressed to force water to flow through the filter element. However, when it is desired to utilize the portable container as a beverage cup to drink a beverage, it is necessary to remove the filter element from the bottle prior to drinking, thereby resulting in inconvenience during use. In the second type, it is not necessary for the bottle to be compressed, and water flows through the filter element, by virtue of the weight itself, which leads to a low filtering efficiency.

SUMMARY OF THE INVENTION

The object of this invention is to provide a water filtering device that is convenient, to use and that has a high filtering efficiency.

According to this invention, a water filtering device comprises:

an inner cylinder unit having an inner end opening, a closed outer end opposite to the inner end opening of the inner cylinder unit, and a first space disposed between said inner end opening and said closed outer end of the inner cylinder unit;

an outer cylinder unit sleeved movably on the inner cylinder unit and movable relative to the inner cylinder unit to convert the water filtering device between an extended state and a retracted state, the outer cylinder unit having an inner end opening in fluid communication with the inner end opening of the inner cylinder unit, and a closed outer end opposite to the inner end opening of the outer cylinder unit; and a filter element disposed within the inner cylinder unit and adjacent to the inner end opening of the inner cylinder unit so as to define a second space between the filter element and the outer cylinder unit;

wherein, when the second space is filled with water, and when the outer cylinder unit is moved on the inner cylinder unit, in such a manner that the closed outer ends of the inner and outer cylinder units are moved toward each other, the water is forced to flow from the second space into the first space through the filter element.

As such, by moving the inner and outer cylinder units relative to each other, water can be filtered without removal of the filter element, thereby resulting in convenience during use and a high filtering efficiency.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 1:
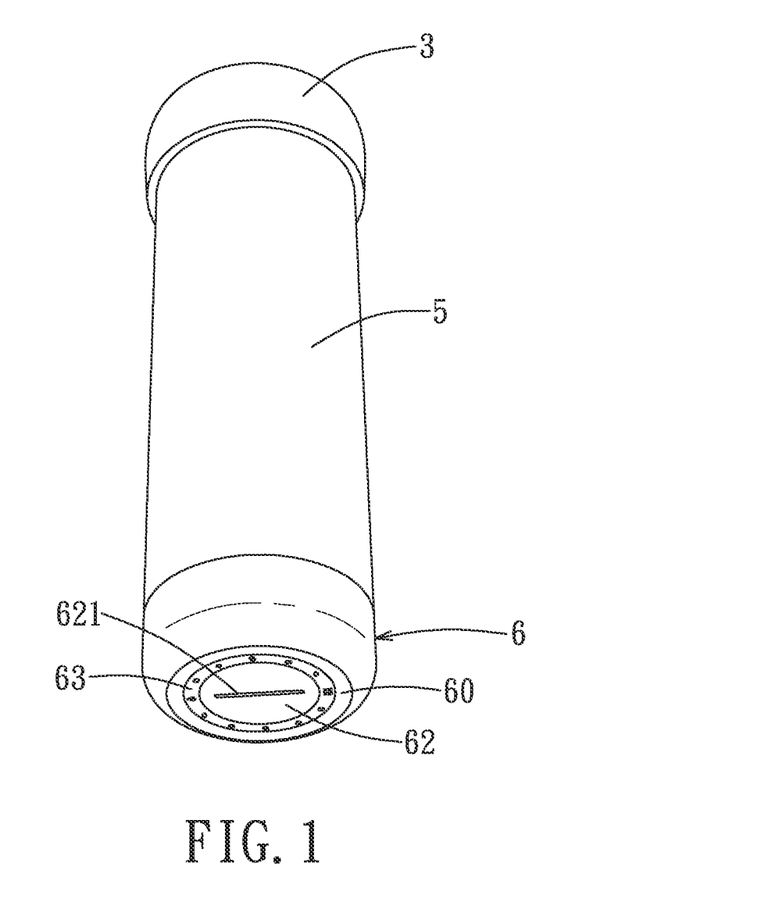
FIG. 1 a perspective view of the first preferred embodiment of a water filtering device according to this invention when in a retracted state.
Figure 2:
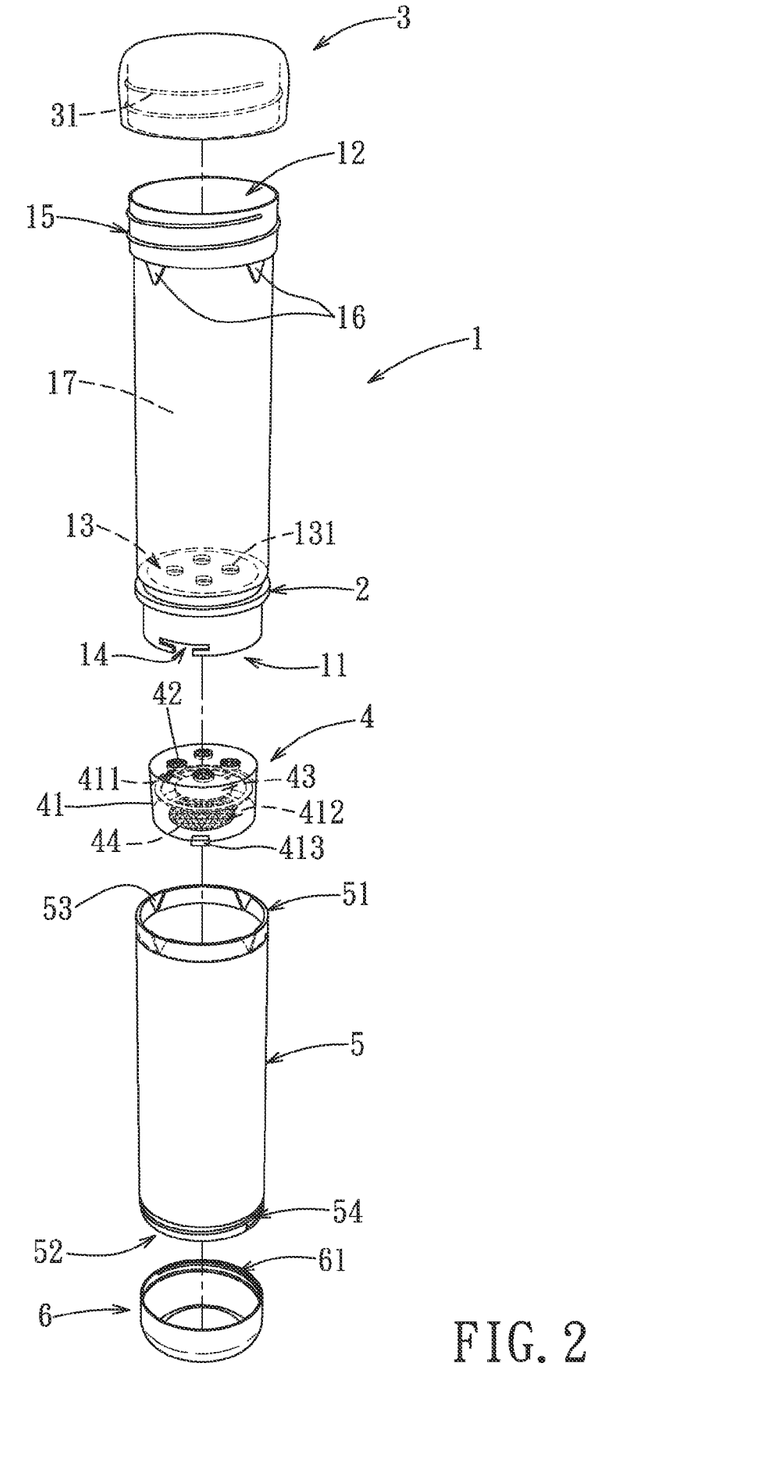
FIG. 2 is an exploded perspective view of the first preferred embodiment.

Referring to FIGS. 1 and 2, the water filtering device according to this invention includes an inner cylinder 1, a sealing ring 2, a first cap 3, a filter element 4, an outer cylinder 5, and a second cap 6. The inner cylinder 1 cooperates with the first cap 3 to constitute an inner cylinder unit. The first cap 3 defines a closed outer end of the inner cylinder unit. The outer cylinder 5 cooperates with the second cap 6 to constitute an outer cylinder unit. The second cap 6 defines a closed outer end of the outer cylinder unit.

The inner cylinder 1 includes an inner end opening 11, an outer end opening 12, a partition 13, two T-shaped notches 14, an externally threaded portion 15, and four positioning protrusions 16. The partition 13 is disposed fixedly within the inner cylinder 1, and is formed with a plurality of partition apertures 131 in fluid communication with the inner end opening 11 and the outer end opening 12. However, in practice, the partition 13 may be formed with only one partition aperture 131. The T-shaped notches 14 are formed in an annular wall of the inner cylinder 1 defining the inner end opening 11. The positioning protrusions 16 are formed on an outer surface of the inner cylinder 1 in a symmetrical manner, and adjacent to the outer end opening 12. The externally threaded portion 15 is disposed between the outer end opening 12 and the positioning protrusions 16.

The first cap 3 has an internally threaded portion 31 engaging the externally threaded portion 15 of the inner cylinder 1, and seals the outer end opening 12. A first space 17 is defined within the inner cylinder 1 between the partition 13 and the first cap 3.

The filter element 4 is disposed in the inner cylinder unit 1 between the inner end opening 11 and the partition 13, and includes a filter housing 41, a plurality of first filtering nets 42, a spacer plate 43, a filtering material (not shown), and a second filtering net 44. The filter housing 41 has a plurality of water outlets 411 permitting water to flow out of the filter element 4 therethrough, a water inlet 412 permitting water to flow into the filter element 4 therethrough, and two position-limiting projections 413. The first filtering nets 42 are disposed respectively within the water outlets 411. The second filtering net 44 is disposed within the water net 412. The filtering material and the spacer plate 43 are disposed in the filter housing 41. The spacer plate 43 is disposed between the water inlet 412 and the water outlets 411 along a longitudinal direction of the inner cylinder 1, and is perpendicular to the longitudinal direction of the inner cylinder 1.

Figure 3:
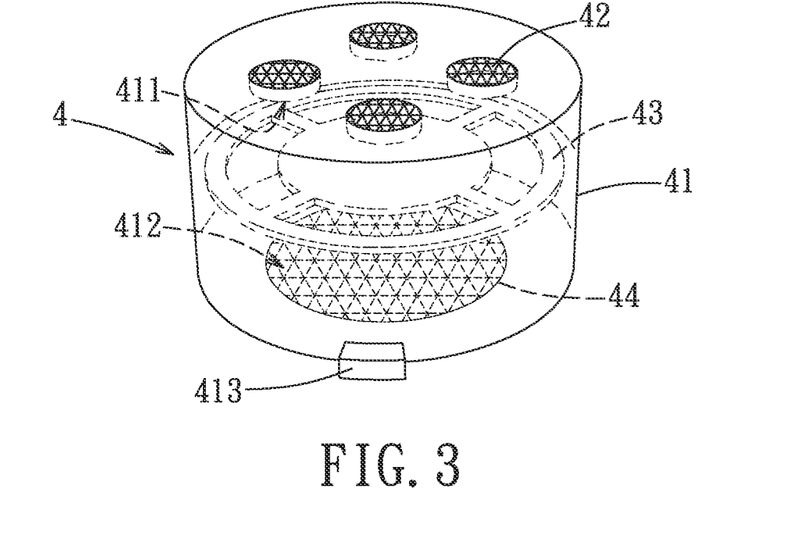
FIG. 3 is a perspective view of a filter element of the first preferred embodiment.
Figure 4:
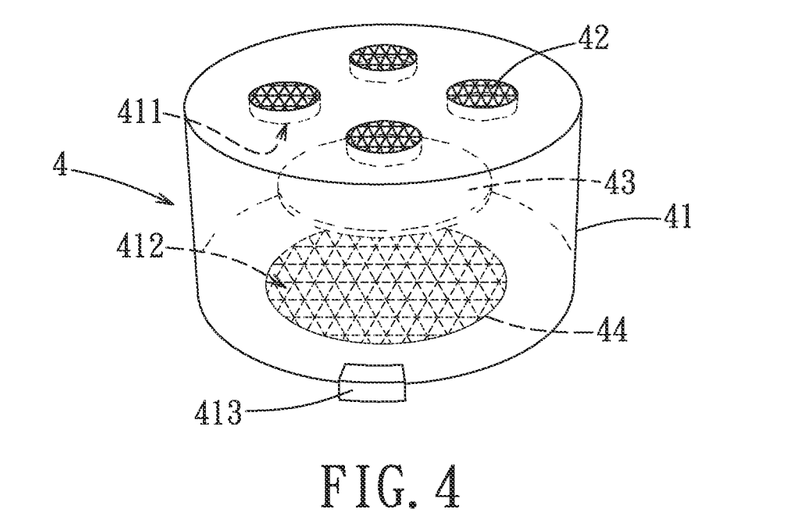
FIG. 4 is a perspective view illustrating a modified filter element.

With further reference to FIGS. 3 and 4, if desired, the configuration, size, and number of the spacer plate 43, the number, size, and positions of the water outlets 411 and the water inlet 412, and the type and characteristics of the filtering material can be changed. For example, the spacer plate 43 can be connected to the filter housing 41 or the filtering material. The filtering material is not limited to one type. For example, one first filtering material and a plurality of second filtering materials can be filled within the filter housing 41, in such a manner that the spacer plate 43 is a waterproof membrane, the first filtering material is an asymmetrical polyester fiber having two opposite sides abutting respectively against the second filtering net 44 and the spacer plate 43, and the remaining space in the filter housing 41 is filled with the second filtering materials.

With particular reference to FIGS. 1 and 2, the position-limiting projections 413 are inserted respectively and movably into the T-shaped notches. The filter element 4 abuts against the partition 13, and is rotatable relative to the partition 13 between an open position and a sealing position. In the open position, the water outlets 411 are aligned with and in fluid communication with the partition apertures 131, respectively, so as to allow water to flow into the partition apertures 131 from the water outlets 411. In the sealing position, the water outlets 411 is misaligned from and isolated fluidly from the partition apertures 131, respectively, so as to prevent water from flowing into the partition apertures 131 from the water outlets 411.

The outer cylinder 5 is sleeved movably on the inner cylinder 1, and includes an inner end opening 51, an outer end opening 52, four positioning grooves 53, and an externally threaded portion 54. The inner cylinder 1 is inserted into the outer cylinder 5 through the inner end opening 51. The inner end opening 51 is in fluid communication with the inner end opening 11 of the inner cylinder 1 and the water inlet 412 of the filter element 4. The positioning grooves 53 are formed in an inner surface of the outer cylinder 5 in a symmetrical manner, and are engageable respectively with the positioning protrusions 16. The sealing ring 2 is disposed between and in frictional contact with the inner and outer cylinders 1, 5, so as to establish a watertight seal therebetween.

The second cap 6 has an internally threaded portion 61 engaging the externally threaded portion 54 of the outer cylinder 5, and seals the out end opening 52 of the outer cylinder 5. The second cap 6 further has a ring body 60 and a rotary disk 62. The internally threaded portion 61 is formed on the ring body 60. A plurality of date-representing characters 63 are disposed on an end surface of the ring body 60 distal from the outer cylinder 5, and are arranged along a circle. A pointer 621 is configured as a straight slot formed in the rotary disk 62 and having an end defined by a colored wall. The rotary disk 62 is rotatable relative to the ring body 60 to align the end of the pointer 621 with a selected one of date-representing characters 63, which corresponds to a use starting date or effective date of the filter element 4. As such, a second space 55 is defined among the filter element 4, the outer cylinder 5, and the second cap 6. The inner and outer cylinder units are movable relative to each other to convert the water filtering device between a retracted state shown in FIG. 1 and an extended state shown in FIG. 7. When the water filtering device is in the retracted state, the positioning protrusions 16 engage respectively the positioning grooves 35 to maintain the water filtering device in the retracted state.

Figure 5:
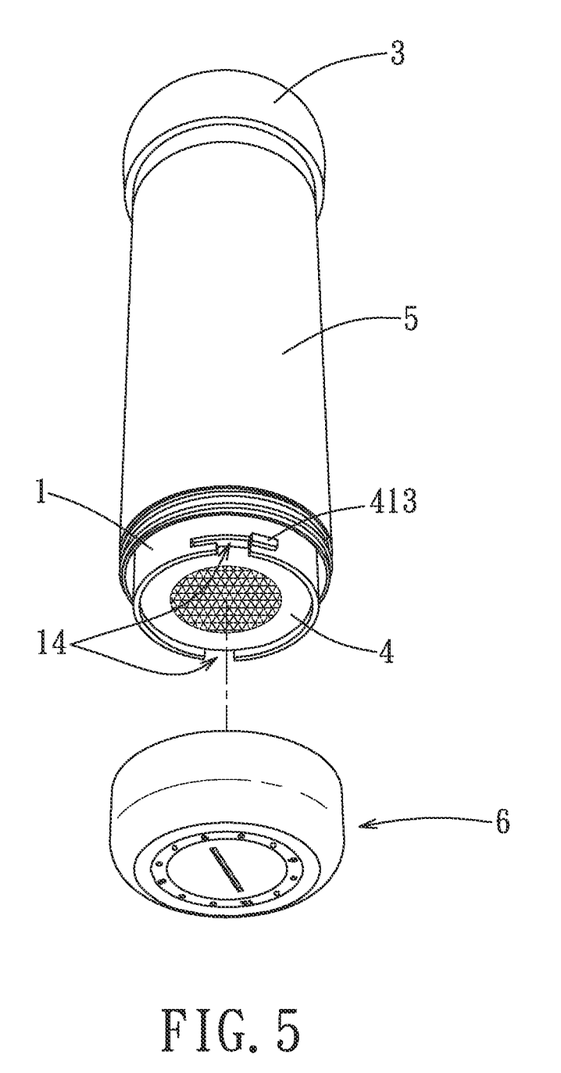
FIGS. 5 and 6 are partly exploded perspective views of the first preferred embodiment.

When it is desired to use the water filtering device as a beverage container, the water filtering device is first converted into the retracted state such that the first cap 3 is disposed above the second cap 6, and the second cap 6 is removed from the outer cylinder 5, as shown in FIG. 5. Next, the position-limiting projections 413 are moved respectively within the T-shaped notches 14 to rotate the filter element 4 to the sealing position. Afterwards, the second cap 6 is mounted back onto the outer cylinder 5, and the first cap 3 is removed from the inner cylinder 1, thereby allowing a beverage to be poured into the first space 17.

Figure 6:
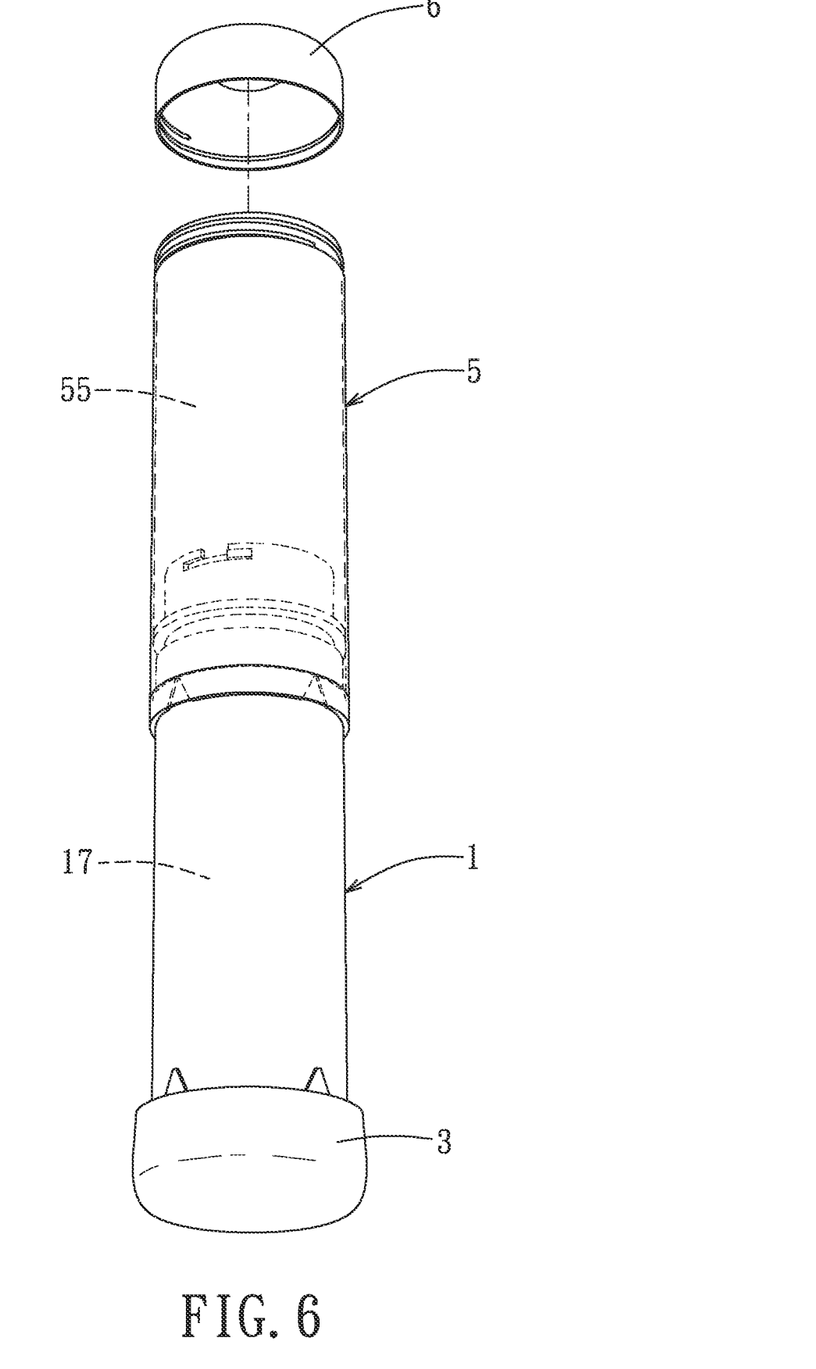
Figure 7:
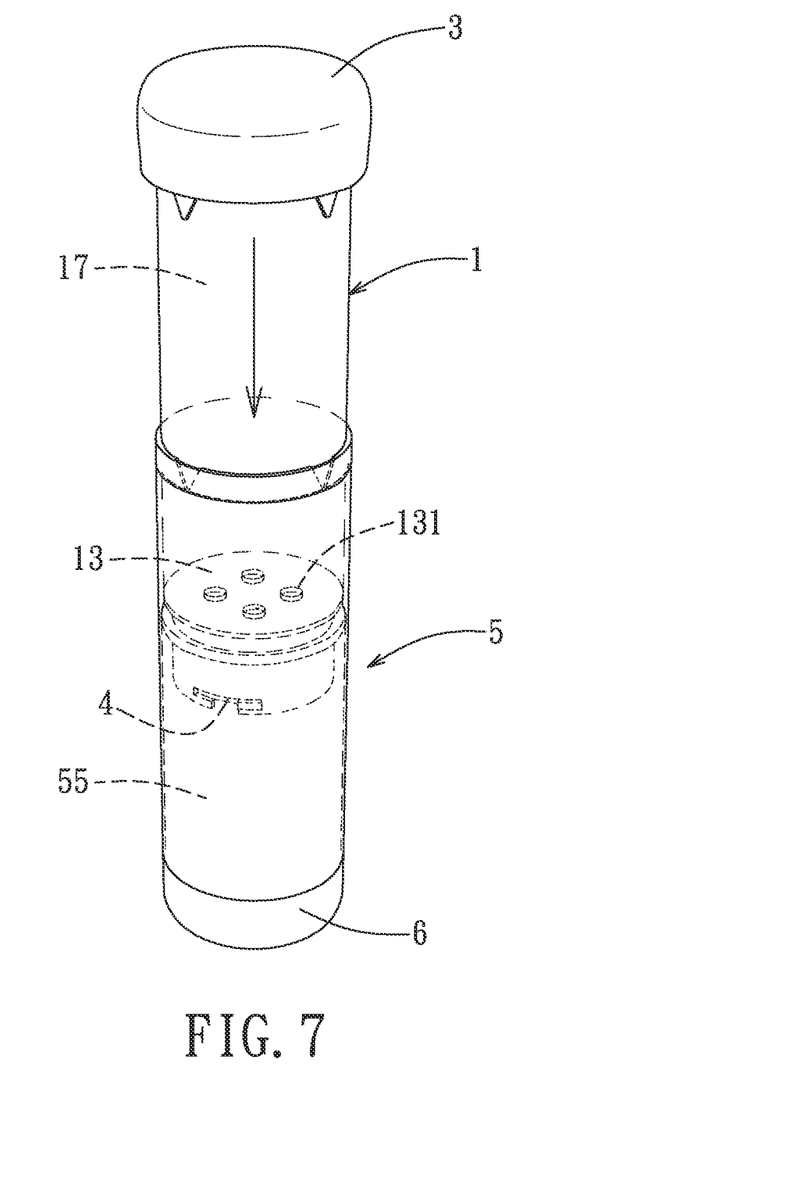
FIGS. 7 and 8 are perspective views of the first preferred embodiment, illustrating how the water filtering device is converted, from an extended state into the retracted state.
Figure 8:
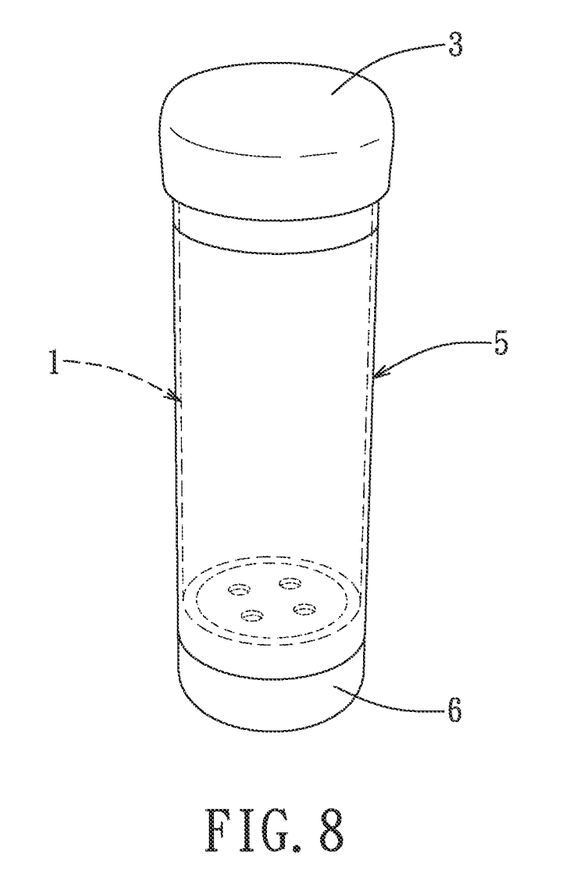
Figure 9:
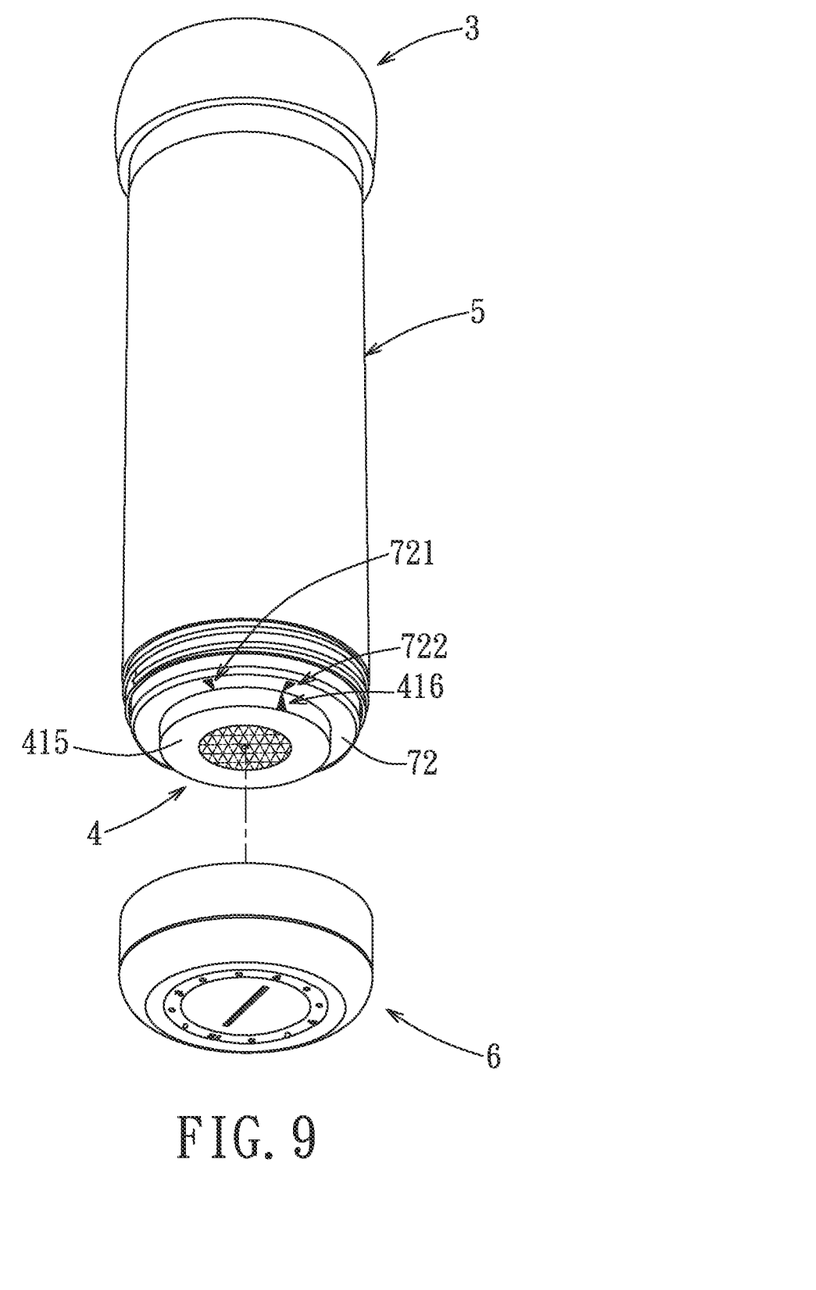
FIGS. 9 and 10 are partly exploded perspective views of the second preferred embodiment of a water filtering device according to this invention.
Figure 10:
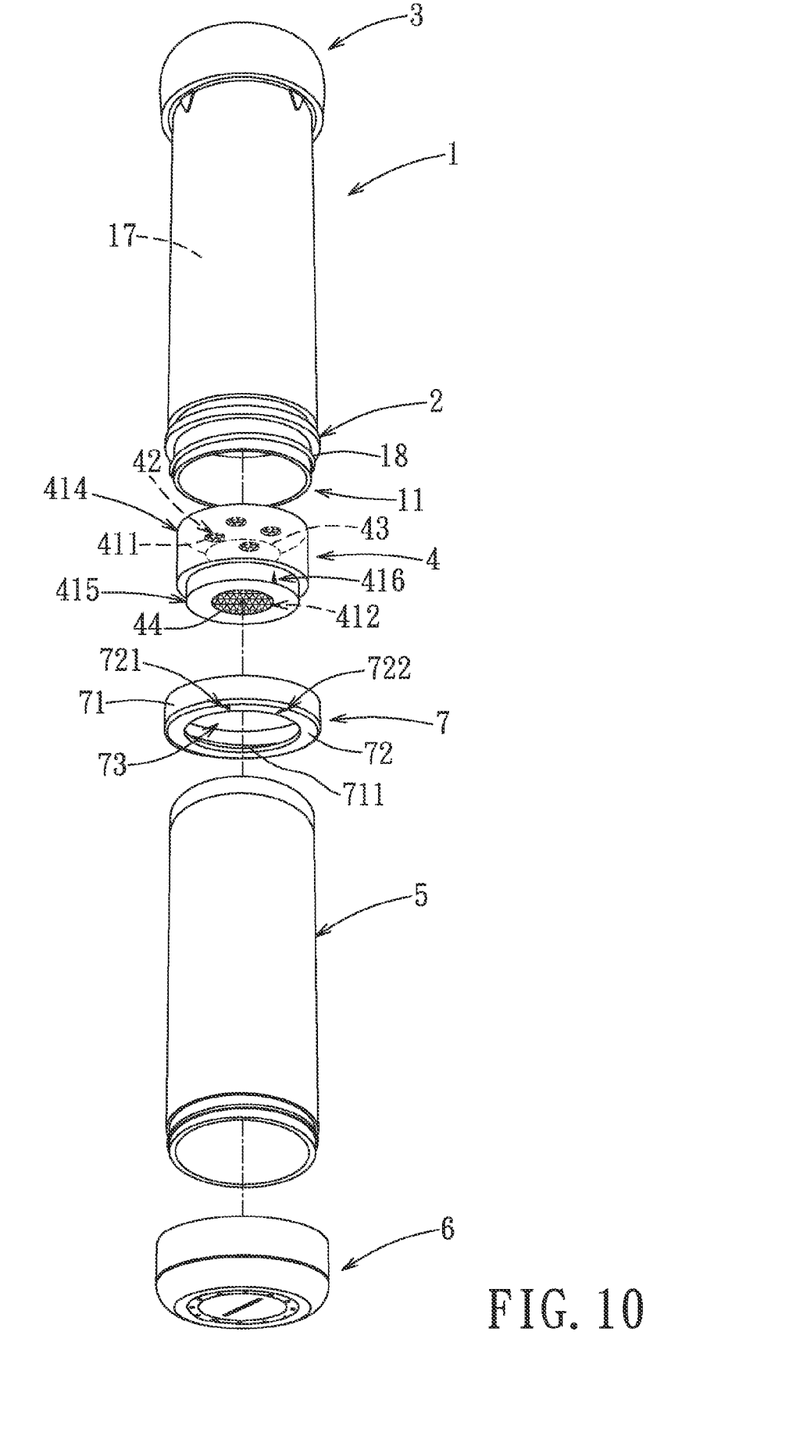

Subsequently, when it is desired to filter water by use of the water filtering device, the water filtering device is converted into the extended state such that the second cap 6 is disposed above the first cap 3, and the second cap 6 is removed from the outer cylinder 5, as shown in FIG. 6. Next, the position-limiting projections 413 are moved respectively within the T-shaped notches 14 to rotate the filter element 4 to the open position. After water to be filtered is poured into the second space 55, the second cap 6 is mounted back onto the outer cylinder 5. Thereafter, the water filtering device is inverted again so that the first cap 3 is disposed above the second cap 6, and the first cap 3 is loosened slightly, and is then pressed and moved toward the second cap 6, as shown in FIG. 7. Hence, the inner cylinder 1 is moved downwardly relative to the outer cylinder 1, so as to compress water in the second space 55 to thereby force the same to flow into the first space 17, in such a manner to allow for outflow of air from the first space 17 through a space between the first cap 3 and the inner cylinder 1. In this manner, the water flows through the filter element 4 to achieve the purpose of water-filtering FIGS. 9 and 10 show the second preferred embodiment of a water filtering device according to this invention, which is similar in construction to the previous embodiment. The differences will be described in the following.

The outer cylinder 1 further includes an externally threaded portion 18 adjacent to the inner end opening 11.

The filter housing 41 of the filter element 4 is two-stepped, and has a first housing portion 414 and a second housing portion 415 connected to the first housing portion 414 and having an outer diameter smaller than that of the first housing portion 414. The water outlets 411 are formed through an end waM of the first housing portion 414. The water inlet 412 is formed through an end wall of the second housing portion 415. The second housing portion 415 has an outer surface provided with a pointing mark 416 that is but not limited to triangular. The spacer plate 43 is disposed between the water outlets 411 and the water inlet 412.

In this embodiment, the water filtering device further includes a fixing ring 7. The fixing ring 7 has a ring body 71, and a flange 72 extending radially and inwardly from an end of the ring body 71 and defining a circular hole 73 in fluid communication with the inner end opening 11 of the inner cylinder 1. The ring body 71 has an internally threaded portion 711 engaging the externally threaded portion 18 of the inner cylinder 1. The flange 72 is provided with a first position-representing mark 721 and a second position-representing mark 722 that are but not limited to triangular.

The second housing portion 415 extends through the circular hole 73. The first housing portion 414 is disposed between and in contact with the partition 13 of the inner cylinder 1 and the flange 72 of the fixing ring 7, so as to prevent movement of said filter element 4 relative to the inner cylinder 1, while allowing for rotation of the filter element 4 relative to the inner cylinder 1. Hence, the second housing portion 415 can be operated to rotate the filter element 4 relative to the inner cylinder 1. When the filter element 4 is at the open position, the pointing mark 416 is aligned with the first position-representing mark 721. When the filter element 4 is at the sealing position, the pointing mark 416 is aligned with the second position-representing mark 722. The pointing mark 416 and the first and second position-representing marks 721, 722 can be colored for facilitating position identification. For example, the pointing mark 416 and the first position-representing mark 721 are green, and the second position-representing mark 722 is red.

Alternatively, the positions of the pointing mark 416 and an assembly of the first and second position-representing marks 721, 722 may be exchanged, and the water filtering device may include only one partition aperture 131 and only one water inlet 411. Or, the flange 72 may be provided with only one position-representing mark that is aligned with the pointing mark 416 only when the filter element 4 is disposed at the open position.

The size of the outer end opening 12 can be increased such that the water filtering device serves as a water filtering bottle. Or, the size of the outer end opening 12 can be reduced such that the water filtering device serves as a water filtering pot. If the inner cylinder 1 has a two-layer structure, and a vacuumed space formed between the two layers, the water filtering device may service as a heat-insulating cup.

With this invention thus explained, it is apparent that numerous modifications and variations can be made without departing from the scope and spirit of this invention. It is therefore intended that this invention be limited only as indicated by the appended claims.

I claim:

1. A water filtering device comprising: an inner cylinder unit having an inner end opening, a closed outer end opposite to said inner end opening of said inner cylinder unit, and a first space disposed between said inner end opening and said closed end of said inner cylinder unit;
   an outer cylinder unit sleeved movably on said inner cylinder unit and movable relative to said inner cylinder unit to convert said water filtering device between an extended state and a retracted state, said outer cylinder unit having an inner end opening in fluid communication with said inner end opening of said inner cylinder unit, and a closed outer end opposite to said inner end opening of said outer cylinder unit; and
   a filter element disposed within said inner cylinder unit and adjacent to said inner end opening of said inner cylinder unit so as to define a second space between said filter element and said outer cylinder unit; wherein,
   when said second space is filled with water, the closed outer end of the inner cylinder is loosened slightly, and said closed outer end of said inner unit and said closed outer end of said outer cylinder unit move toward each other, the water is forced to flow from said second space into said first space through said filter element,
   said outer cylinder unit includes an outer cylinder formed with said inner end opening at one end thereof and a second cap with an end surface connected removably to another end of said outer unit, constituting a closed end of said outer cylinder unit,
   a rotary disk disposed rotatably on said second cap,
   a plurality of date-representing characters arranged along a circle and disposed on said end surface of said second end cap, and
   a pointer disposed on said rotary disk,
   wherein said pointer is configured as a straight slot formed in said rotary disk.

2. The water filtering device as claimed in claim 1, further comprising a sealing ring disposed between said inner and outer cylinder units so as to establish a watertight seal therebetween.

3. The water filtering device as claimed in claim 1, wherein:
   said inner cylinder unit includes an inner cylinder formed with said inner end opening of said inner cylinder unit at one end thereof, and a first cap connected removably to the other end of said inner cylinder and constituting said dosed end of said inner cylinder unit.

4. The water filtering device as claimed in claim 3, wherein said rotary disk is positioned such that, by rotating said rotary disk relative to said second cap, said pointer can be brought into alignment with one of date-representing characters.

5. The water filtering device as claimed in claim 3, wherein said inner cylinder unit further has a partition disposed fixedly therein and formed with at least one partition aperture, said partition cooperating with said first cap to define said first space therebetween, said filter element, being disposed between said, partition and said inner end opening of said inner cylinder unit, said filter element including a filter housing, at least one water inlet formed in said filter housing and permitting water to flow into said filter element therethrough, and at least one water outlet, formed in said filter housing and permitting water to flow out of said filter element therethrough, said filter housing abutting against said partition and being rotatable relative to said partition between an open position, where flow of water from said partition aperture of said partition into said at least one water outlet of said filter housing is allowed, and a sealing position, where flow of water from said partition aperture into said water outlet is prevented.

6. The water filtering device as claimed in claim 5, wherein said filter element further includes a spacer plate that is disposed between said water inlet and said water outlet along a longitudinal direction of said inner cylinder unit and that is perpendicular to the longitudinal direction of said inner cylinder unit.

7. The water filtering device as claimed in claim 5, wherein said inner cylinder unit further has an annular wall defining said inner end opening and formed with at least one T-shaped notch, said filter element further includes a position-limiting projection extending from said filter housing and inserted movably into said T-shaped notch, said position-limiting projection being movable within said T-shaped notch when said filter housing, moves between said open position and said sealing position.

8. The water filtering device as claimed in claim 5, wherein;
   said filter housing is two-stepped, and has a first housing portion and a second housing portion connected to said first housing portion and having an outer diameter smaller than that of said first housing portion, said water outlet being formed in said first housing portion, said water inlet being formed in said second housing portion,
   said inner cylinder unit further has an externally threaded portion adjacent to said inner end opening of said inner cylinder unit; and
   said water filtering device further comprises a fixing ring disposed on an outer surface of said inner cylinder unit and adjacent to said inner end opening of said inner cylinder unit, said fixing ring having a ring body, and a flange extending radially and inwardly from an end of said ring body and defining a circular hole in fluid communication with said inner end opening of said inner cylinder unit, said ring body having an internally threaded portion engaging said externally threaded portion of said inner cylinder unit, said second housing portion extending through said circular hole, said first housing portion being disposed between and in contact with said partition of said inner cylinder unit and said flange of said fixing ring, so as to prevent movement of said filter element relative to said inner cylinder unit.

9. The water filtering device as claimed in claim 8, wherein said second housing portion is provided with a pointing mark, and said flange is provided with a first position-representing mark and a second-representing mark that are positioned such that, when said filter element is at said open position, said pointing mark is aligned said first position-representing mark, and when said filter element is at said sealing position, said pointing mark is aligned with said second position-representing mark.

10. The water filtering device as claimed in claim 1, wherein one of said inner and outer cylinder units is formed with at least one positioning groove, and the other of said inner and outer cylinder units is formed with at least one positioning protrusion that engages said positioning groove when said water filtering device is in the retracted state, so as to maintain said water filtering device in said retracted state.

11. A water filtering device comprising:
an inner cylinder unit having an inner end opening, a closed outer end opposite to the inner end opening of the inner cylinder unit, and a first space disposed between the inner end opening and the closed end of the inner cylinder unit;
an outer cylinder unit sleeved movably on the inner cylinder unit and movable relative to the inner cylinder unit to convert the water filtering device between an extended state and a retracted state, the outer cylinder unit having an inner end opening in fluid communication with the inner end opening of the inner cylinder unit, and a closed outer end opposite to the inner end opening of the outer cylinder unit; and
a filter element disposed within the inner cylinder unit and adjacent to the inner end opening of the inner cylinder unit so as to define a second space between the filter element and the outer cylinder unit, wherein,
the inner cylinder unit includes an inner cylinder formed with the inner end opening of the inner cylinder unit at one end thereof, and a first cap connected removably to other end of the inner cylinder and constituting the closed end of the inner cylinder unit,
when the second space is filled with water, the first cap on the closed outer end of the inner cylinder is loosened slightly, and the closed outer end of the inner unit and the closed outer end of the outer cylinder unit move toward each other, the water is forced to flow from the second space into the first space through the filter element,
the inner cylinder unit further has a partition disposed fixedly therein and formed with at least one partition aperture, the partition cooperating with the first cap to define the first space therebetween, the filter element, being disposed between the partition and the inner end opening of the inner cylinder unit, the filter element including a filter housing, at least one water inlet opening formed in the filter housing and permitting water to flow into the filter element therethrough, and at least one water outlet opening, formed in the filter housing and permitting water to flow out of the filter element therethrough, the filter housing abutting against the partition and being rotatable relative to the partition between an open position, where the at least one partition aperture is aligned with the at least one water outlet opening such that a flow of water from the at least one partition aperture of the partition into the at least one water outlet opening of the filter housing is allowed, and a sealing position, where the at least one partition aperture is not aligned with the at least one water outlet opening such that a flow of water from the at least one partition aperture into the water outlet is prevented.

12. The water filtering device as claimed in claim 11, further comprising a sealing ring disposed between the inner and outer cylinder units so as to establish a watertight seal therebetween.

13. The water filtering device as claimed in claim 11, wherein the outer cylinder unit includes an outer cylinder formed with the inner end opening of the outer cylinder unit at one end thereof, and a second cap connected removably to the other end of the outer cylinder unit and constituting the closed end of the outer cylinder unit.

14. The water filtering device as claimed in claim 13, wherein the second cap includes a cap body having an end surface distal from the outer cylinder, a rotary disk disposed rotatably on the cap body, a plurality of date-representing characters arranged along a circle and disposed on the end surface of the cap body, and a pointer disposed on the rotary disk is positioned such that, by rotating the rotary disk relative to the second cap, the pointer can be brought into alignment with one of date-representing characters.

15. The water filtering device as claimed in claim 14, wherein the pointer is configured as a straight slot formed in said rotary disk.

* * * * *